United States Patent [19]

Lewis

[11] 4,420,667

[45] Dec. 13, 1983

[54] INDUCTION HEATING METHOD AND APPARATUS FOR ELONGATED WORKPIECES

[75] Inventor: John C. Lewis, Dundas, Canada

[73] Assignee: Park-Ohio Industries, Inc., Shaker Heights, Ohio

[21] Appl. No.: 390,409

[22] Filed: Jun. 21, 1982

[51] Int. Cl.$^3$ .............................................. H05B 5/00
[52] U.S. Cl. ............................ 219/10.41; 219/10.71; 219/10.43; 219/10.77
[58] Field of Search ............... 219/10.41, 10.43, 10.49, 219/10.57, 10.67, 10.69, 10.71, 10.75, 10.79; 148/146, 150, 154

[56] References Cited

U.S. PATENT DOCUMENTS

| | | |
|---|---|---|
| 294,932 | 8/1881 | Lewis . |
| 320,550 | 11/1881 | Wagar . |
| 358,446 | 3/1882 | Lewis . |
| 1,690,612 | 11/1925 | Anderson et al. . |
| 1,764,068 | 1/1927 | Crook . |
| 2,281,850 | 2/1939 | McKinney . |
| 2,490,104 | 12/1949 | Strickland .......................... 219/13 |
| 2,811,623 | 10/1957 | Guthrie ............................ 219/10.41 |
| 3,057,985 | 10/1962 | Biringer .......................... 219/10.41 |
| 3,489,620 | 3/1967 | Current . |
| 3,610,861 | 10/1971 | Storey et al. ..................... 219/10.41 |
| 3,743,808 | 7/1973 | Kasper ............................. 219/10.77 |
| 4,093,839 | 6/1978 | Moliterno et al. ............... 219/10.71 |
| 4,158,758 | 6/1979 | Kunioka et al. ................. 219/10.43 |
| 4,307,276 | 12/1981 | Kurata et al. .................... 219/10.41 |

FOREIGN PATENT DOCUMENTS

| | | |
|---|---|---|
| 1508430 | 10/1969 | Fed. Rep. of Germany . |
| 1533955 | 2/1970 | Fed. Rep. of Germany . |
| 2801661 | 8/1979 | Fed. Rep. of Germany . |
| 815003 | 7/1937 | France . |
| 1557249 | 1/1969 | France . |
| 2360674 | 3/1978 | France . |

Primary Examiner—B. A. Reynolds
Assistant Examiner—M. M. Lateef
Attorney, Agent, or Firm—Body, Vickers & Daniels

[57] ABSTRACT

Elongated workpieces having an extended intermediate portion of substantially uniform cross-section and axially spaced end or other portions of enlarged cross-section are inductively heated to a desired surface temperature by axially moving them at a continuous rate of speed coaxially of and sequentially through a succession of three axially aligned multiturn induction heating coils and energizing selective ones of the heating coils, during the passage therethrough of selected ones of the workpiece portions to inductively heat the same to the desired surface temperature. The coils have separate power supply circuits for energizing the coils, and suitable control means are provided for activating the power supply circuits to energize the coils in succession and during the travel of the selected portions of the workpiece through selected ones of the heating coils.

5 Claims, 4 Drawing Figures

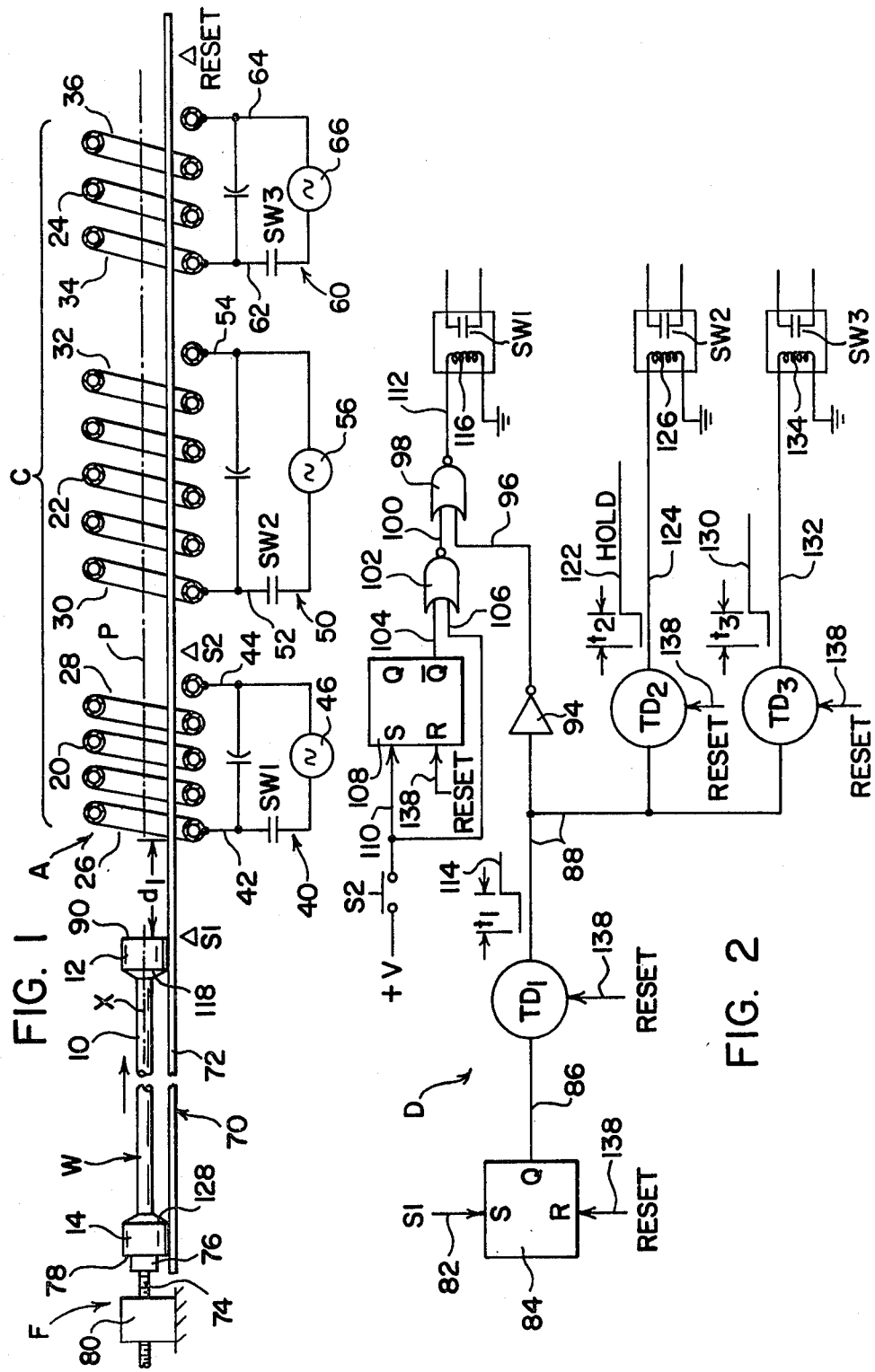

INDUCTION HEATING METHOD AND APPARATUS FOR ELONGATED WORKPIECES

BACKGROUND OF THE INVENTION

This invention relates in general to induction heating of elongated metal workpieces and, more particularly, to a method and apparatus for inductively heating to a uniform surface temperature an elongated workpiece having an extended intermediate portion of uniform cross-section and relatively short, axially spaced, end or other portions of enlarged cross-section.

The invention is particularly applicable to the heating of so-called sucker rods which are employed in oil wells and the like and will be described with particular reference thereto. However, it will be appreciated that the invention has broader applications and may be used for inductively heating a variety of elongated workpieces having an intermediate portion of substantially uniform cross-sectional shape extending between axially spaced portions of enlarged cross-sectional shape.

Sucker rods are utilized in the petroleum industry as a connecting link between a down hole oil well pump and the lifting or pumping device on the surface. Each rod is quite long, normally being of the order of magnitude of 25-30 feet in length. A major portion of the length of the rod, hereinafter referred to as the intermediate or central bar portion of the rod, has a uniform cross-section which may be of circular, hexagonal, or the like cross-section and is generally uniform over its entire length. At their opposite ends, the rods are provided with comparatively short enlarged or upset end portions for facilitating interconnection of a plurality of the rods together in end-to-end relationship with each other. While there are a number of specific or detailed modifications which may be included in the sucker rod configurations of different manufacturers, almost all such rods have the foregoing general conformation and characteristics.

As one of their manufacturing steps, the sucker rods are usually heated to a given predetermined surface temperature and then passed through an electrostatic spray chamber for application of a coating of paint or plastic-like material thereto. Since the rods need only be surface heated for this purpose, induction type heating finds particular use in this environment. However, because sucker rods do not have uniform cross-sections throughout the entirety of their length, it is necessary to in some way compensate for the heating variations which otherwise occur at the enlarged or upset end portions. Unless each rod is heated to a uniform surface temperature over the entire length thereof, the paint or plastic-like coating subsequently applied to the rods will not have a uniform consistency, thickness, etc. thereon, particularly as between the elongated central bar portions and the enlarged ends.

A number of different arrangements to compensate for this difficulty have been previously proposed and employed heretofore. Such solutions include voltage regulation for the inductor, delay on or off timers, various alternative inductor configurations and the like. However, none of these proposed or previously employed arrangements have satisfactorily solved the problem of uniformly heating the surface of sucker rods or other similar elongated workpieces having sections of enlarged cross-section at their opposite ends.

It has been considered desirable, therefore, to devise an improved induction heating arrangement for sucker rods or similar workpieces which facilitates induction heating thereof to a substantially uniform surface temperature throughout the entire length of the rods. The method and apparatus described herein is deemed to provide such an improved heating arrangement which satisfactorily overcomes the foregoing problems and others.

BRIEF SUMMARY OF THE INVENTION

The present invention contemplates a new and improved induction heating method and apparatus for heating an elongated workpiece, having an extended intermediate portion of uniform cross-section and axially spaced end portions of enlarged cross-section, to a substantially uniform surface temperature throughout, which method and apparatus overcomes all of the above-referred to problems and others and is of comparatively simple and easily controlled character and adaptable for automatic operation.

Briefly stated, in accordance with one aspect of the invention, elongated workpieces such as the above-described sucker rods or the like are each axially moved at a continuous rate of speed axially and sequentially through a series of three axially aligned and spaced induction heating coils selective ones of which are energized during the passage therethrough of selective portions of the workpiece to inductively heat such workpiece portions to a desired surface temperature.

In accordance with another aspect of the invention, respective ones of the induction heating coils are energized only during the passage therethrough of a different one of the leading end, intermediate, and trailing end portions of a workpiece such as a sucker rod of the above-referred to type.

In accordance with a preferred embodiment of the invention, the first coil of the coil series is energized only during the passage therethrough of the leading end portion of a workpiece of the above-described type, the second coil is energized only during the passage therethrough of the intermediate or central bar portion of the workpiece, and the third coil is energized only during the passage therethrough of the trailing end portion of the workpiece.

The principal object of the invention is to provide an improved method of inductively heating an elongated workpiece, having an intermediate portion of uniform cross-section extending between portions of enlarged cross-section, to heat such workpiece portions to a desired surface temperature.

Another object of the invention is to provide an improved method of inductively heating elongated workpieces of the above-mentioned type so that the intermediate portion and enlarged cross-section portions thereof are heated to a substantially uniform surface temperature.

Still another object of the invention is to provide an improved method of inductively heating an elongated workpiece, having an extended length intermediate portion of uniform cross-section and enlarged cross-section end portions, to a desired surface temperature throughout the entire length of the workpiece.

A further object of the invention is to provide an improved apparatus for inductively heating the intermediate and the enlarged cross-section portions of elongated workpieces of the above-mentioned type to a desired surface temperature.

A still further object of the invention is to provide a method and apparatus which automatically operates to energize one or more of a succession of three axially aligned induction heating coils through which a workpiece of the above-mentioned type is passed in a sequence such as to inductively heat the intermediate and the enlarged cross-section portions of the workpiece to a desired surface temperature.

Further objects and advantages of the invention will appear from the following detailed description of a species thereof and from the accompanying drawings.

BRIEF DESCRIPTION OF THE DRAWINGS

In the drawings:

FIG. 1 is a schematic side elevational view of an induction coil heating arrangement for inductively heating in accordance with the invention an elongated workpiece such as a sucker rod having enlarged ends;

FIG. 2 is a circuit diagram of a representative control circuit for energizing the various induction heating coils shown in FIG. 1 in the manner according to the invention as the workpiece passes therethrough;

DESCRIPTION OF THE PREFERRED EMBODIMENTS

Figure 3:
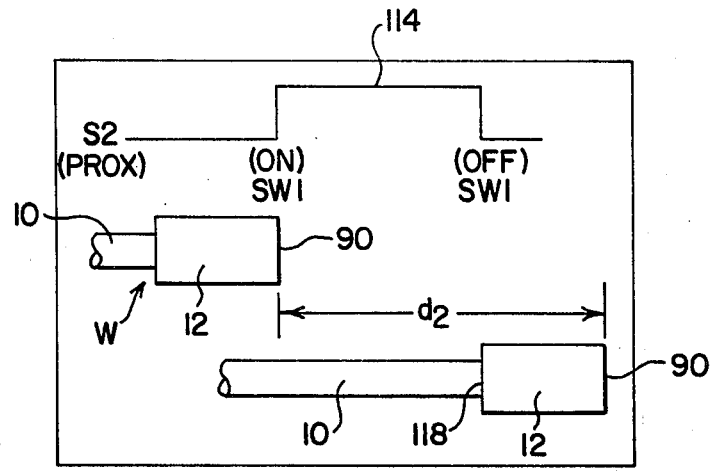
FIG. 3 is a block diagram showing the manner in which the circuit of FIG. 2 operates to energize and de-energize the first coil of the induction heating coil arrangement of FIG. 1 as the workpiece passes through the first coil; and, FIG. 4 is a time-logic diagram showing the manner in which the circuit of FIG. 2 operates to energize and de-energize the various coils of the induction heating arrangement of FIGS. 1 and 2 in timed sequence during the passage of a workpiece through the coils.

Referring now to the drawings wherein the showings are for purposes of illustrating the preferred embodiment of the invention only and not for the purpose of limiting same, FIG. 1 shows an induction heating arrangement A comprising the invention for inductively heating an elongated workpiece W such as a sucker rod to a uniform surface temperature throughout its entire length. The sucker rod W is made of steel or other ferrous metal and comprises an extended length main or intermediate central bar portion 10 of generally uniform cross-sectional shape throughout, and short opposite end portions 12 and 14 of enlarged cross-sectional shape. Central portion 10 may be of circular, hexagonal, or like cross-sectional shape while the enlarged or upset coupling end portions 12, 14 may be of generally circular cross-section. A plurality of the sucker rods W may be mechanically interconnected in end-to-end relation at the enlarged or upset coupling ends 12, 14 to form a composite sucker rod assembly of desired overall length for use in an oil well. Typically, the central portion 10 of the sucker rod W has a cross-sectional thickness dimension in the range of ½ to 1⅛" while the enlarged ends 12, 14 have a cross-sectional thickness dimension ranging between 1 to 2¼". The overall length of the sucker rod may be around 25 to 30 feet with the length of each enlarged end portion 12, 14 being relatively small, generally on the order of several inches. It will be appreciated that other forms of sucker rods W are available, and that the present invention is equally applicable to such other forms of sucker rods or to like workpieces W having intermediate bar portions 10 extending between axially spaced enlarged cross-section portions 12, 14.

During the manufacture and processing of sucker rods of the type described above, each rod is generally heated to a uniform elevated surface temperature, e.g. around 400° F. or so, for subsequent application thereto and curing of a paint or plastic-type coating thereon. The induction heating arrangement A comprising the invention and schematically shown in FIG. 1 is advantageously suited for such purpose. The heating arrangement A comprises an induction heating coil assembly C comprised of a series of three multiturn axially aligned and preferably axially spaced induction heating coils 20, 22 and 24 of generally cylindrical cross-section form and defining a straight line workpiece heating path P extending through the coils. The heating coils are formed of hollow copper tubing, as is well known in the art, to provide a continuous passageway for the circulation of a suitable coolant therethrough.

The first coil 20 in the series of coils 20, 22, 24 has entrance and exit ends 26, 28; the second coil 22 has entrance and exit ends 30, 32; and the third heating coil 24 has entrance and exit ends 34, 36. Leads 42, 44 connect the first coil 20 at its opposite ends in a circuit 40 for connecting this coil 20 to a power supply such as an AC generator 46 through a switch SW1; leads 52, 54 connect the second coil 22 at its opposite ends in a circuit 50 for connecting this coil 22 to a similar power supply 56 through a switch SW2; and leads 62, 64 connect the third coil 24 at its opposite ends in a circuit 60 for connecting this coil 24 to a similar power supply 66 through a switch SW3. The power supplies 46, 56 and 66 may each comprise any one of a number of different types such as typically employed in induction heating devices and having appropriate output frequencies and power capabilities required to perform the desired heating function.

Although the coils 20, 22, 24 are shown as having the same diametrical size, they may be of somewhat different diameters, proportional to the different cross-sectional sizes of the workpiece center portion 10 and end portions 12, 14 in order to thereby afford substantially the same degree of magnetic coupling between the surfaces of these workpiece portions 10, 12, 14 and the respective coils in which they are heated while permitting passage of the workpiece therethrough. Thus, the first and third coils 20 and 24 which principally heat the enlarged end portions 12, 14 of the workpieces W may be of proportionately larger diametrical size than that of the center coil 22 which principally heats the smaller diameter intermediate or bar portion 10 of the workpiece. Compensation for the difference in the air gap between the coils and the segments of the workpiece which the coils heat, can be provided in the number of turns in the coils or in the power supplied to the coils. Also, although the three coils 20, 22, 24 are shown as axially spaced from one another, it will be appreciated that, for the purposes of the invention, they need not be axially spaced from one another.

The workpiece W to be heated is axially moved or advanced at a uniform rate of speed coaxially of and sequentially through and in inductively coupled relation with selected ones of the coils 20, 22, 24 in the workpiece heating path P thereof. For this purpose, suitable elongated workpiece support or guide means 70 are provided for supporting the elongated workpiece W in rested position thereon with its linear axis X aligned with the axis or workpiece path P of the coils 20, 22, 24, and for permitting sliding movement of the workpiece therealong in the workpiece path P and through the coils. The workpiece support means 70 may suitably comprise, as shown, a pair of side-by-side parallel slide rails 72 on which the enlarged ends 12, 14 of the workpiece are rested and along which the workpiece is adapted to slide for axial feed movement therealong and through the heating coils. The slide rails 72 extend completely through the coils 20, 22, 24 in parallel relation to and below the common axis P of the coils, and a sufficient distance in advance of the first coil 20 as well as beyond the last coil 24 to maintain the workpiece W properly supported in axially aligned position with the common center axis or heating path P of the coils during the feed movement of the workpiece toward and completely through the coils.

The feed movement of the workpiece W at a substantially continuous rate of speed along the slide rails 72 toward and through the coils 20, 22, 24 may be produced by any suitable workpiece feed means F such as commonly employed for this purpose in induction heating arrangements. In the particular case illustrated, the workpiece feed means F is comprised of a push rod 74 which extends more or less in axial alignment with the axis X of the workpiece W resting on the rails 72 and is provided with an enlarged head end 76 which abuts the rearward end 78 of the workpiece to push it in the workpiece feeding direction along the slide rails 72. The push rod 74 is advanced and retracted by any suitable power drive means such as an electric motor 80 which rotates a screw drive including a rotatable nut or internally threaded collar or ring gear (not shown) which is threadably engaged with the push rod.

In the general operation of the induction heating arrangement A according to the invention, the workpiece W is pushed along the slide tracks 72 at a substantially uniform rate of speed toward the first heating coil 20 and through the three coils 20, 22, 24 by the feed means F. During the course of this workpiece feed movement, the coils 20, 22, 24 are selectively energized to respectively heat one or more of the portions 10, 12 and 14 of the workpiece. In the preferred manner of operation of the heating arrangement A, the first coil 20 is energized only during the passage therethrough of the enlarged leading end portion 12 of the workpiece, the second coil 22 is energized only during the passage therethrough of the extended intermediate or smaller diameter central bar portion 10 of the workpiece, and the third or last coil 24 is energized only during the passage therethrough of the enlarged trailing end portion 14 of the workpiece. It will be appreciated, however, that in some cases it may be desirable or necessary to heat one or more of the workpiece portions 10, 12, 14 in two different ones of the coils, or one or two of the respective workpiece portions in all three of the coils, in order to thereby achieve the desired heating of the workpiece portions 10, 12, 14 to a desired surface temperature or the entire workpiece W to a uniform surface temperature throughout the length thereof.

Suitable control means such as, for example, a digital electronic control circuit D such as generally shown in FIG. 2, are provided for energizing the respective coils 20, 22, 24 in sequence and in timed relation to the entrance into and passage through each one of the coils of the particular workpiece portion 10, 12 or 14 to be inductively heated therein. During the feed or advance movement of a workpiece W along the workpiece path P, as shown by the arrow in FIG. 1, toward the heating coil assembly C, the advancing workpiece trips a proximity switch or sensor S1 at a given point along the workpiece path located a predetermined distance $d_1$ in advance of the entrance end 26 of the first heating coil 20. When tripped, proximity switch S1 provides a positive pulse on line 82 to a first flip-flop 84, setting the latter. The Q output of flip-flop 84 is set and held at a logic 1. The logic 1 at the Q output of flip-flop 84 is transmitted on line 86 to, and initiates the cycle of time delay element $TD_1$ which normally has a logic 0 output. Time delay element $TD_1$ maintains a logic 0 output on line 88 for time interval $t_1$ which corresponds to the time required for the forward end 90 of the advancing workpiece W to travel the distance $d_1$ from the proximity switch S1 to, or reach, the entrance end 26 of the first heating coil 20 following the closure of the proximity switch S1. At the end of time interval $t_1$, the $TD_1$ output on line 88 changes to a logic 1. This logic 1 output on line 88 initiates the cycles of cycle timers $TD_2$ and $TD_3$ and applies a logic 1 input to inverter 94. The output of inverter 94 goes to a logic 0 and applies a logic 0 input on line 96 to the first input of NOR gate 98. The second input of NOR gate 98, on output line 100 of another NOR gate 102, also is at this time at a logic 0 as a result of one of the inputs to this gate, on line 104, then being at a logic 1, and the other input to this gate, on line 106, then being at a logic 0. The logic 1 input to gate 102 on line 104 is the $\overline{Q}$ output of a second flip-flop 108 which output is at this time at a logic 1 as reset at the end of the previous operating cycle of the apparatus. The logic 0 input to gate 102 on line 106 is held at this level by a pulldown resistor or the like (not shown) and remains at this zero level until normally open proximity switch S2 in the input line 110 to the set terminal S of flip-flop 108 is tripped. On application of the logic 0 inputs to both input lines 96, 100 of NOR gate 98 at the end of time interval $t_1$, as described above, the output of NOR gate 98 on line 112 therefore goes to a logic 1 as indicated at 114 and energizes the solenoid coil 116 of relay SW1 which, in turn, closes the contacts of switch SW1 to energize the circuit 40 and the first induction heating coil 20. The leading upset end portion 12 of the workpiece W is then inductively heated by the energized coil 20 as it proceeds therethrough.

Figure 4:
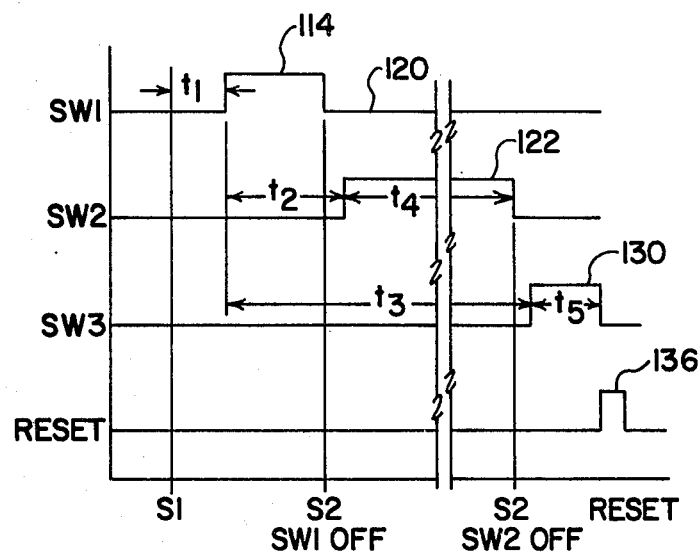

Upon emerging from coil 20, the leading edge 90 of workpiece W continues to travel toward the second coil 22. Proximity switch S2 is positioned at the exit end of first coil 20. When the leading edge 90 of workpiece W passes proximity switch S2, the switch S2 is tripped or closed, causing a logic 1 input to be applied to the set terminal S of flip-flop 108 to set the latter. The $\overline{Q}$ output of flip-flop 108 on line 104 goes to a logic 0 which is then inputted to NOR gate 102. At the same time, the logic 1 input on line 110 is applied through line 106 to NOR gate 102. As a result, the output of NOR gate 102 on line 100 and inputted on this line to NOR gate 98 remains at a logic 1 and the output of NOR gate 98 on line 112 likewise remains the same as before at logic 1. Thus, the solenoid coil 116 of relay SW1, and the circuit 40 and coil 20, are kept energized during the passage of the leading end portion 12 of the workpiece past the proximity switch S2. However, when the workpiece W has traveled the distance $d_2$ (FIG. 3) so that the trailing edge 118 of the leading upset end portion 12 of the workpiece W passes beyond switch S2 to permit the opening thereof, the input on line 106 to NOR gate 102 then goes back to a logic 0 while the other input on line 104 to this NOR gate 102 remains at the logic 0 level previously set at the $\overline{Q}$ output of the flip-flop 108. The output of NOR gate 102 thus goes to a logic 1 which is then inputted on line 100 to NOR gate 98. Since the other input to NOR gate 98 on line 96 from inverter 90 remains at the logic 0 level following time interval $t_1$, the output of NOR gate 98 on line 112 therefore goes to a logic 0 as indicated at 120 (FIG. 4) and de-energizes the solenoid coil 116 of relay SW1 which, in turn, opens the contacts of switch SW1 to de-energize the circuit 40 and the first induction heating coil 20.

Simultaneously with the energization of the first coil 20 by the closure of switch SW1 in the power supply circuit 40 by the action of the logic 0 output signal from $TD_1$ in line 88, this same logic 0 output signal from $TD_1$ in line 88 actuates the two cycle timer units $TD_2$ and $TD_3$. At the end of a predetermined time interval $t_2$ (FIG. 4) previously set in the now actuated cycle timer $TD_2$, this unit sends a logic 1 output signal 122 through line 124 for a pre-selected interval $t_4$. The time interval $t_2$ corresponds to the time normally required for the leading end 118 of the intermediate portion 10 of the advancing workpiece W to travel the distance from the position it occupies when the leading edge 90 of the workpiece W is at the entrance end 26 of the first coil 20, to a position at the entrance end 30 of the second coil 22, following the closure of switch SW1 to energize the first coil 20. The logic 1 signal 122 in line 124 actuates the solenoid 126 of the solenoid-actuated switch or relay SW2 in the power supply circuit 50 of the second coil 22 so as to close the switch SW2 and energize the circuit 50 and the second coil 22 to thus initiate inductive heating of the workpiece intermediate portion 10. The coil 22 is then maintained in its energized state to effect the continued heating of the workpiece by the coil 22, throughout the entire time interval $t_4$ required for the extended length intermediate portion 10 of the advancing workpiece to pass completely through the energized second coil 22, by the continued presence of the logic 1 pulse signal 122 in the output line 124 of cycle timer unit $TD_2$. At the end of such time interval $t_4$, the cycle timer unit $TD_2$ changes the logic 1 output signal in line 124 to a logic 0, thereby causing the de-energization of the solenoid 126 and opening of switch SW2 and power supply circuit 50 with resulting de-energization of the coil 22.

At the end of predetermined time interval $t_3$ (FIG. 4) also previously set in the now actuated cycle timer unit $TD_3$ and corresponding to the time required for the forward edge 128 of the trailing end portion 14 of the workpiece W to travel the extensive distance from its position when the leading end 90 of workpiece W entered the entrance end 26 of coil 20 to a position at the entrance end 34 of the third coil 24, following the closure of switch SW1 to energize the first coil 20, the actuated cycle timer unit $TD_3$ sends a logic 1 output signal 130 through line 132 for a preselected time interval $t_5$. This signal in line 132 then causes the actuation of the solenoid 134 of the solenoid-actuated switch or relay SW3 in the power supply circuit 60 of the third coil 24 so as to close the switch SW3 and energize the circuit 60 and the third coil to thus initiate inductive heating of the workpiece trailing end portion 14 in this coil. The coil 24 is then maintained in its energized state to effect the continued heating of the workpiece by the coil 24, throughout the entire time interval $t_5$ required for the trailing end portion 14 of the advancing workpiece to pass completely through coil 24, by the continued presence of the logic 1 pulse signal 130 in the output line 132 of cycle timer unit $TD_3$. At the end of such time interval $t_5$, the cycle timer unit $TD_3$ changes the output on line 132 to a logic 0, thereby causing the de-energization of the solenoid 134 and opening of switch SW3 and power supply circuit 60 with resulting de-energization of the coil 24.

It will be appreciated, of course, that during the passage of the workpiece W through the coil assembly C, the degree of energization of the various coils 20, 22, 24 by their respective power supplies 46, 56 and 66 are so proportioned, relative to the magnetic coupling of each of the workpiece portions 10, 12 and 14 to the respective coil in which they are heated as well as to their travel times therethrough, as to assure the heating of the workpiece portions 10, 12, 14 to the desired surface temprature, or the entire length of the workpiece W to a substantially uniform surface temperature throughout, on exiting of the workpiece from the coil assembly C.

Shortly following the passage of the workpiece W beyond the exit end 36 of the last coil 24, the exiting workpiece trips or actuates a RESET switch (FIG. 1) as it passes therebeyond. The RESET switch will have a positive output when the trailing edge 78 of the workpiece W passes beyond this switch. A positive pulse 136 (FIG. 4) thus will be applied on RESET switch output line 138 to the reset terminals R of each flip-flop 84 and 108 and each time delay device $TD_1$ and cycle timer $TD_2$ and $TD_3$, thereby resetting the entire circuit and apparatus A in readiness for the start of the next operating cycle thereof.

Switches S1 and S2 are simple momentary contact switches. Also, pull up and pull down resistors and noise suppression capacitors are applied to the logic lines of the control circuit D as is conventional in the art. The cycle timers used as time delay element $TD_1$ and cycle timers $TD_2$ and $TD_3$ are commercially available as individual elements or a single multi-circuit, multi-interval reset timer. These cycle timers have dial, switch, or other adjustment means by which the time intervals $t_1$, $t_2$, $t_3$, $t_4$ and $t_5$ may be simply adjusted. Since the workpiece feed means F advances the workpieces W at a known fixed rate or speed, it is a simple matter to determine the proper time intervals $t_1$, $t_2$, $t_3$, $t_4$ and $t_5$ for heating a given workpiece in the coils 20, 22 and 24 and appropriately adjust timers $TD_1$, $TD_2$ and $TD_3$. It will be appreciated, moreover, that the same control functions provided by the control circuit D can be generated and controlled by a commercial solid state digital program controller.

Following the heating of a workpiece W such as a sucker rod in the manner described above in the inductive heating arrangement A, the heated sucker rod W may be directly passed into a conventional coating apparatus for application thereto of a paint or plastic-type coating which is then cured by the uniformly heated condition of the workpiece surface to thereby form a finished coating of uniform consistency, thickness, etc. thereon, particularly as between the elongated central bar portion 10 and the enlarged ends 12, 14 of the sucker rods.

Although with the preferred inductive heating arrangement A as described above, the leading end portion 12 of the workpiece W is heated only in the first coil 20, the intermediate portion 10 is heated only in the second coil 22, and the trailing end portion 14 is heated only in the third coil 24, it may be desirable or even necessary in some instances to heat one or more of the workpiece portions 10, 12 and 14 in more than one of the coils 20, 22, 24 in order to obtain the desired surface temperature for the workpiece portions 10, 12 and 14 or a uniform surface temperature throughout the entire length of the workpiece. The energization of the coils 20, 22, 24 in such modified embodiments of the invention may be controlled by the adjustment of the means as described above, or by any other suitable means for the purpose such as by digital electronic circuit arrangements, for instance, which are well within the knowledge of those skilled in the digital electronics field.

Having thus described the invention, the following is claimed:

1. A method of inductively heating to a substantially uniform surface temperature an elongated workpiece having a longitudinal axis and formed with an intermediate extended length portion of substatially uniform cross-sectional shape throughout and relatively short, axially spaced, leading and trailing portions of enlarged cross-sectional shape, which method comprises the steps of:
(a) axially moving said workpiece at a predetermined rate of speed coaxially of and sequentially through a succession of first, second, and third axially aligned, stationary multiturn induction heating coils, and
(b) consecutively energizing selected ones of said heating coils one at a time in sequence during the passage therethrough of selected portions of said workpiece whereby said portions are inductively heated to desired surface temperatures.

2. A method as defined in claim 1 wherein: the said first coil is energized only during passage therethrough of the said leading end portion of the workpiece; the said second coil is energized only during passage therethrough of said intermediate portion of the workpiece; and the said third coil is energized only during passage therethrough of the said trailing end portion of the workpiece.

3. A method of inductively heating to a substantially uniform surface temperature an elongated workpiece having a longitudinal axis and formed with an intermediate extended length portion of substantially uniform cross-sectional shape throughout and relatively short axially spaced, leading and trailing end portions of enlarged cross-sectional shape, which method comprises the steps of:
(a) axially moving the said workpiece continuously at a given rate of speed coaxially of and sequentially through a succession of first, second, and third axially aligned multiturn induction heating coils, and
(b) actuating a time delay circuit control means for said coils, when the said leading end portion of the advancing workpiece reaches a predetermined pre-entry distance from the entrance end of said first coil, to progressively effect the energization of the said first coil only during passage threthrough of the said leading end portion of the workpiece, the energization of the said second coil only during passage therethrough of said intermediate portion of the workpiece, and the energization of the said third coil only during passage therethrough of the said trailing end portion of the workpiece.

4. Apparatus for inductively heating to a substantially uniform temperature an elongated workpiece having an extended intermediate portion of uniform cross-sectional shape and axially spaced leading and trailing portions of enlarged cross-sectional shape, said apparatus comprising: a set of three axially aligned, stationary induction heating coils defining a workpiece heating workpath, means for axially moving said workpiece continuously at a given rate of speed coaxially of and sequentially through said coils along said workpiece, coil energizing means including separate electrical circuits for selectively connecting said coils to power supply means for energizing said coils, and circuit control means actuated by said workpiece during the travel thereof along said workpath to close the said circuits and energize the said coils in succession as the said leading portion, said extended intermediate portion, and said trailing portion of the workpiece travel through selected ones of said coils, said circuit control means operative to energize the said coils only during the travel of each of said workpiece portions through a different one of said coils.

5. Apparatus as defined in claim 4 wherein the said circuit control means is operative to energize:
(a) the first one of said coils only during passage therethrough of the said leading portion of the workpiece;
(b) the second one of said coils only during passage therethrough of the said intermediate portion of the workpiece; and
(c) the third one of said coils only during passage therethrough of the said trailing portion of the workpiece.

* * * * *

UNITED STATES PATENT AND TRADEMARK OFFICE
CERTIFICATE OF CORRECTION

PATENT NO. : 4,420,667
DATED : December 13, 1983
INVENTOR(S) : John C. Lewis

It is certified that error appears in the above-identified patent and that said Letters Patent are hereby corrected as shown below:

Title page, Item [56]-References Cited, "294,932 8/1881" should read -- Appln. 294,932 8/1981 --; "320,550 11/1881" should read -- Appln. 320,550 11/1981 --; "358,446 3/1882" should read -- Appln. 358,446 3/1982 --; "1,690,612 11/1925" should read -- 1,690,612 11/1928 --; "1,764,068 1/1927" should read -- 1,764,068 6/1930 ---; "2,281,850 2/1939" should read -- 2,281,850 5/1942 --; "3,489,620 3/1967" should read -- 3,489,620 1/1970 --; Column 1, line 52, "of" should read -- or --. Column 7, line 2, reference numeral "90" should read -- 94 --. Column 10, line 16, after "uniform" insert -- surface --; line 24, "workpiece" should read -- workpath --.

Signed and Sealed this

Seventeenth Day of July 1984

[SEAL]

Attest:

GERALD J. MOSSINGHOFF

Attesting Officer

Commissioner of Patents and Trademarks